(12) United States Patent
Cho

(10) Patent No.: US 7,419,603 B2
(45) Date of Patent: Sep. 2, 2008

(54) WATER TREATMENT METHOD

(75) Inventor: Young I. Cho, Marlton, NJ (US)

(73) Assignee: Drexel University, Philadelphia, PA (US)

( * ) Notice: Subject to any disclaimer, the term of this patent is extended or adjusted under 35 U.S.C. 154(b) by 0 days.

(21) Appl. No.: 11/763,190

(22) Filed: Jun. 14, 2007

(65) Prior Publication Data
US 2007/0227980 A1 Oct. 4, 2007

Related U.S. Application Data

(63) Continuation of application No. 10/493,094, filed as application No. PCT/US02/33955 on Oct. 23, 2002, now Pat. No. 7,244,360.

(60) Provisional application No. 60/347,853, filed on Oct. 23, 2001.

(51) Int. Cl.
*C02F 1/48* (2006.01)

(52) U.S. Cl. ............... 210/712; 205/751; 210/714; 210/737; 210/738; 210/748; 210/764; 210/787

(58) Field of Classification Search .............. 210/714
See application file for complete search history.

(56) References Cited

U.S. PATENT DOCUMENTS

| | | | |
|---|---|---|---|
| 3,843,507 A * | 10/1974 | Kwan | 204/643 |
| 3,936,376 A * | 2/1976 | Centineo | 204/515 |
| 4,235,698 A * | 11/1980 | Arnaud | 204/648 |
| 4,861,489 A * | 8/1989 | Swift et al. | 210/668 |
| 4,865,748 A | 9/1989 | Morse | |
| 4,963,268 A | 10/1990 | Morse | |
| 5,326,446 A | 7/1994 | Binger | |
| 5,423,962 A * | 6/1995 | Herbst | 205/742 |
| 5,549,812 A | 8/1996 | Witt a.k.a. Witte | |
| 5,611,907 A * | 3/1997 | Herbst et al. | 205/742 |
| 5,725,778 A * | 3/1998 | Cho et al. | 210/695 |
| 5,882,530 A * | 3/1999 | Chase | 210/788 |
| 6,203,710 B1 * | 3/2001 | Woodbridge | 210/695 |
| 6,733,654 B1 * | 5/2004 | Itzhak | 205/742 |
| 7,052,600 B2 * | 5/2006 | McKay | 210/167.3 |
| 7,244,360 B2 * | 7/2007 | Cho | 210/712 |

* cited by examiner

*Primary Examiner*—Peter A. Hruskoci
(74) *Attorney, Agent, or Firm*—Knoble, Yoshida & Dunleavy LLC

(57) ABSTRACT

The present invention provides a physical water treatment (PWT) method and apparatus to treat liquid coolants. Electrodes (22, 24) are provided in a coolant stream (21), and an alternating voltage is applied across the electrodes (22, 24) to produce an electric field through the coolant. The alternating voltage creates an oscillating electric field in the coolant that promotes the collision of dissolved mineral ions. The ions collide to form seed particles that precipitate out of solution. Bulk precipitation of seed particles decreases the availability of ions in solution which can crystallize on heat transfer surfaces. The seed particles adhere to additional ions that separate out of solution and form larger particles that may be removed from the coolant stream (21) using a variety of treatment measures. In addition to precipitating mineral ions, the electric field may be applied to destroy bacteria, algae and microorganisms that accumulate in the coolant stream (21).

26 Claims, 8 Drawing Sheets

WATER TREATMENT METHOD

CROSS-REFERENCE TO RELATED APPLICATIONS

This application is a continuation of U.S. patent application Ser. No. 10/493,094, filed on Apr. 20, 2004, now U.S. Pat. No. 7,244,360, which in turn is a 35 U.S.C. 371 continuation of International Application No. PCT/US02/33955, filed on Oct. 23, 2002, designating the United States, which in turn claims priority from U.S. Provisional Application No. 60/347,853, filed Oct. 23, 2001, under 35 U.S.C. 119(e), the entire disclosure of which is incorporated herein by reference.

FIELD OF THE INVENTION

This invention relates to water treatment, and more specifically to an apparatus and a process for minimizing mineral scaling and bacterial growth on equipment that stores and/or conveys water.

BACKGROUND OF THE INVENTION

Containers and conduits that store or transport liquids often accumulate mineral deposits from minerals present in the liquid. For example, $Ca^{++}$ ions combine with $HCO_3^-$ ions to form $CaCO_3$ particles. Mineral deposits form in liquids in a variety of ways. Some mineral ions combine in the liquid stream and form particles that settle onto surfaces in the form of a soft loose sludge. This is sometimes called particulate fouling. In other instances, ions come out of solution at a heat transfer surface and form hard crystalline deposits or scaling that binds to the heat transfer surface. This latter phenomenon is often referred to as crystallization or precipitation fouling.

Scaling can create significant problems in heat exchangers and other equipment that have hot surfaces in contact with liquid. The solubility of mineral compounds in water, such as $CaCO_3$, decreases as the water increases in temperature. This is sometimes referred to as inverse solubility. As a result, when water enters a heat exchanger and increases in temperature, dissolved mineral ions in the water come out of solution at the heat transfer surface where the water is the hottest. The calcium ions adhere directly to the heat transfer surface as they react with $HCO_3^-$ ions. In the case of calcium ions, the reaction is:

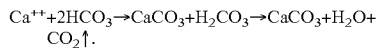

$$Ca^{++}+2HCO_3 \rightarrow CaCO_3+H_2CO_3 \rightarrow CaCO_3+H_2O+CO_2\uparrow.$$

As the reaction of $CaCO_3$ occurs on the heat transfer surface, the $CaCO_3$ particles bind to the heat transfer surface to form scale. Excessive scaling can damage heat exchangers and reduce the rate of heat transfer through the heat transfer surface. In extreme cases, scaling will permanently damage equipment.

Mineral deposits in fluid conduits and equipment require periodic removal. Brush punching tools that have a coarse scrubbing surface are adequate to remove softer mineral deposits formed by particulate fouling. However, brush punching is not effective to remove scaling caused by crystallization fouling, and additional cleaning measures must be used. For example, chemical cleaning with acid solutions is often used in conjunction with brush punching to remove hardened scale from heat transfer surfaces. These techniques are time consuming and labor intensive, requiring the equipment to be shut down for significant periods of time.

In the present state of the art, physical water treatment (PWT) methods are used to reduce scaling in heat transfer equipment. These methods use a variety of mechanisms, including permanent magnets, solenoid-coils, pressure drop devices, and vortex flow devices. Although these methods employ different technologies, they are all used to promote bulk precipitation of mineral particles at locations away from heat transfer surfaces. This reduces the dissolved concentration of mineral ions that enters the heat exchanger, reducing the potential for scale formation in the heat exchanger. In the case of calcium ions, PWT methods enhance molecular attraction of $Ca^{++}$ with $HCO_3^-$ ions to precipitate $CaCO_3$ particles in water.

In PWT methods, the aim is to encourage the formation of soft sludge through particulate fouling, and prevent hardened deposits formed by crystallization fouling. Mineral ions are precipitated out of solution away from heat transfer surfaces to form seed particles in the bulk liquid. This reduces the concentration of ions entering the heat exchanger, and thereby decreases the potential for scaling on the heat transfer surfaces. As seed particles enter the heat exchanger, they attract additional mineral ions that come out of solution as the water temperature increases. The seed particles combine with the ions to form relatively large particles that can be easily removed from the liquid stream. Particles that settle out of the liquid form a soft sludge through particulate fouling. This sludge may be easily removed by punch brushing, or by scouring in areas having a higher water velocity.

In many prior art PWT methods, an electrical field is employed to encourage the attraction of $Ca^{++}$ ions and $HCO_3^-$ ions toward one another. One or more elements are placed on the exterior of a pipe or container, out of contact with the water, to generate an indirect electrical field in the water. Indirect electric fields have limited effectiveness in reducing scale, because they generally do not provide a strong enough electric field in the water to efficiently induce bulk precipitation. For example, it is known to surround a water carrying conduit with a solenoid coil driven by an alternating polarity in a square-wave current signal to induce a pulsating (reversing) electric field within the water. The electric field in the water is governed by Faraday s Law. According to Faraday s law, the electric field E is described by:

$$\int E \cdot ds = -\delta/\delta t \int B \cdot dA$$

where E is an induced electric field vector, s is a line vector in the electric field, B is a magnetic field strength vector, and A is the cross sectional area of the solenoid coil. In this arrangement, an induced electric field is produced within the water, but the field typically has a limited electric field strength. When the solenoid is driven by a square-wave voltage signal having a voltage of 12 volts, 5 amperes peak, and a frequency of 500 Hz, the electric field strength is not more than about 5 mV/cm.

Under Faraday s law, the strength of the induced electric field depends on the solenoid coil diameter. The electric field strength induced in the water generally decreases as the diameter of the pipe increases. Therefore, to provide adequate field strength in larger pipes, larger solenoid coil diameters must be used, thereby increasing material and energy costs.

The strength of the induced electric field is also dependent on the frequency of the signal. Bulk precipitation generally becomes more efficient with higher frequencies (i.e. frequencies greater than 3,000 Hz). However, self-induction in the solenoid system increases with frequency under Faraday s law, negating any benefit gained from the increased frequency. In practice, the frequency in the solenoid-coil system is limited to 500 to 3,000 Hz. Since it is not efficient to use high frequencies in large pipe applications (i.e., greater than 6 inch diameter), solenoid-coil systems are not desirable. From the foregoing, it is apparent that existing PWT methods that utilize indirect electrical fields for the reduction of scaling leave something to be desired.

SUMMARY OF THE INVENTION

In accordance with a first aspect of the invention, a method for treating a liquid to reduce scaling is provided. In the method, a first and a second electrode are placed in direct contact with the liquid, and the liquid flows between the first and second electrodes. A voltage difference is applied between the first and second electrodes to form an electrical field across the liquid stream. The voltage is varied to create an oscillating electrical field through the liquid. A square wave voltage may be used to stimulate collision of dissolved mineral ions in the liquid to precipitate the minerals into seed particles, which are carried in the liquid stream and ultimately removed. An optional filter may be added in the fluid line to remove the seed particles from the liquid stream. In addition, a chemical may be added to the liquid stream to enhance separation of mineral ions from solution. The applied voltage may also be used to provide a high frequency electric field that is adequate to destroy bacteria, algae and microorganisms in the liquid.

In accordance with a second aspect of the present invention, a coolant system is provided that operates in accordance with the first aspect of the invention described above. A coolant stream, such as a cooling water stream used to cool condenser tubes in a heat exchanger unit, is passed through a conduit. A pair of opposing electrodes are mounted in the interior of the conduit and configured so that the coolant stream passes between the electrodes. A power control unit is connected to the electrodes and sends an electric signal to the electrodes to generate an electric field across the coolant stream. The conduit connects to a heat exchanger that may be located downstream from the electrodes.

BRIEF DESCRIPTION OF THE DRAWINGS

The foregoing summary as well as the following description will be better understood when read in conjunction with the drawing figures in which.

DETAILED DESCRIPTION OF THE INVENTION

Figure 1:
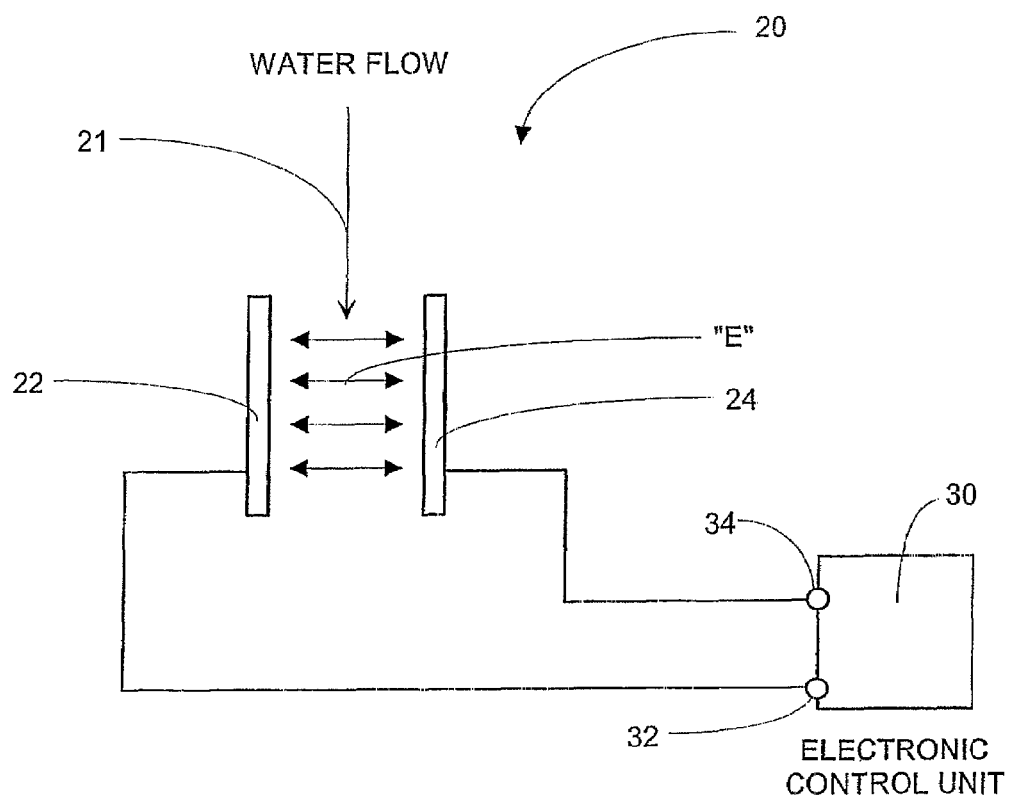
FIG. 1 is a schematic diagram of a water treatment apparatus in accordance with the present invention.

Referring now to the drawings, and to FIG. 1 in particular, an apparatus for inducing an electric field is shown and designated generally as 20. The apparatus 20 has a first electrode 22 and a second electrode 24. The first electrode 22 is connected by a wire to first terminal 32 on a power source 30, and the second electrode 24 is connected by a wire to a second terminal 34 on the power source. The electrodes 22,24 are spaced apart, and a voltage difference is applied across the electrodes to create an electric field. In FIG. 1, the electric field is represented by the double-ended arrows labeled E. The electrodes are placed in direct contact with a coolant stream 21 flowing through a cooling system. In FIG. 1, water is used as the coolant 21. The electrodes are positioned to apply the electric field directly across the liquid stream. The apparatus 20 is operable to promote bulk precipitation of mineral ions present in the liquid and reduce the potential for scaling in cooling system components.

In contrast to other treatment techniques, the electrodes 22,24 used in the apparatus 20 are in direct contact with the coolant 21, rather than affixed to the exterior of a pipe or vessel. As a result, the electric field is applied directly to the coolant stream. The electric field properties are not limited by pipe diameter and are not subject to self-inductance under Faraday's law. Consequently, the electrodes 22, 24 can produce a higher field strength and operate at higher frequencies to more efficiently precipitate mineral ions from the coolant 21.

The present invention may be used with a variety of coolants and coolant applications. For example, the present invention may be used to treat a coolant stream that removes heat from condenser tubes in a chiller or air conditioning unit. The coolant is treated to precipitate mineral ions and reduce the potential for scaling on heat transfer surfaces in the condenser tubes. The present invention may also be used with a liquid coolant in any application where it is desirable to control scaling on heat transfer surfaces. For purposes of this description, the present invention will be described as it is used with cooling water that is recycled through a chiller or air conditioning unit to remove heat from condenser tubes.

Figure 2:
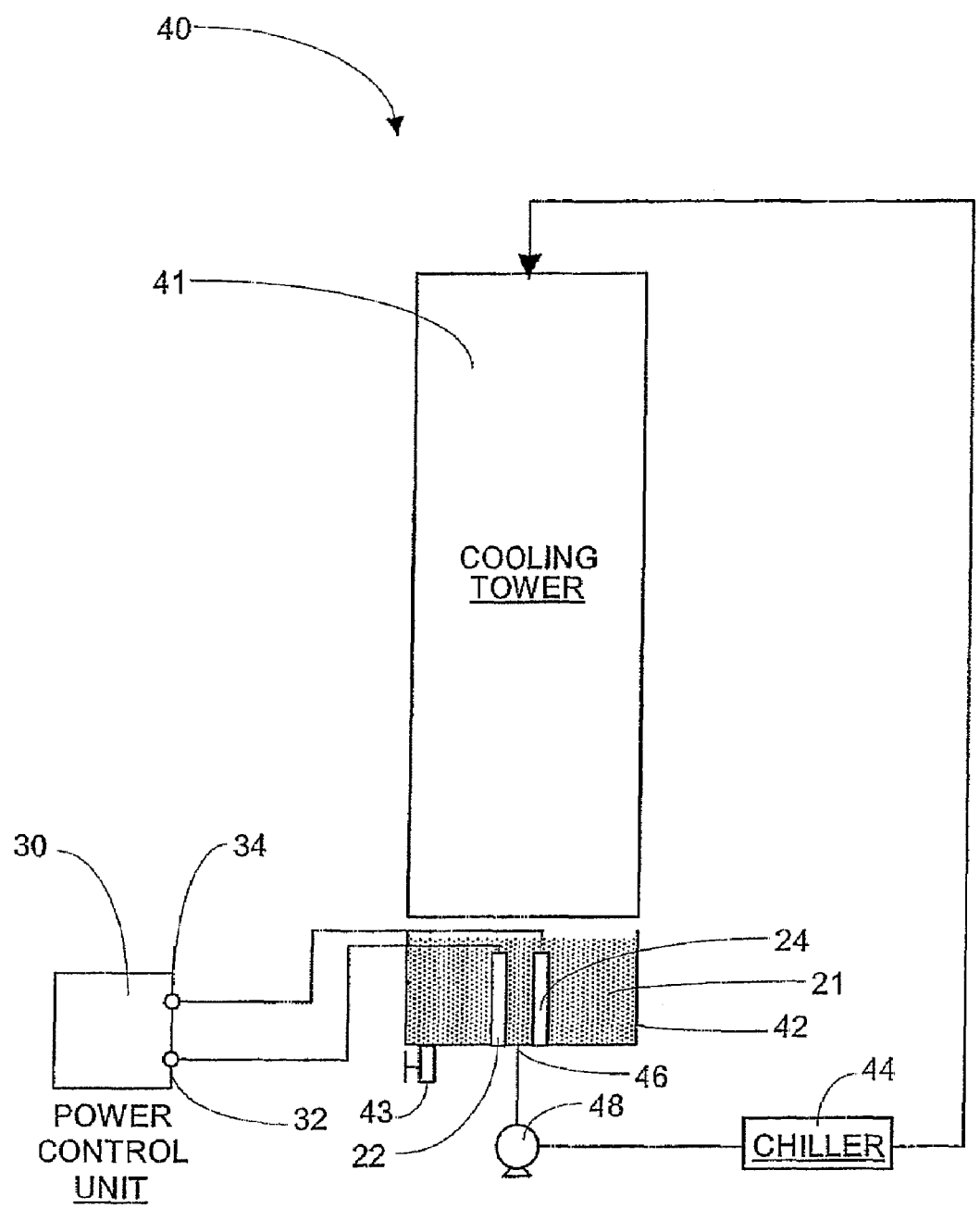
FIG. 2 is a schematic diagram of a water coolant system that employs a water treatment apparatus in accordance with the present invention.

Referring now to FIGS. 2-5, embodiments of the present invention will be described in greater detail. As shown in FIG. 2, the electrodes 22, 24 are typically installed in a cooling water system 40 for a chiller unit 44. Cooling water 21 is circulated through the condenser side of the chiller unit 44 to remove heat from condenser tubes. The heated cooling water 21 is discharged from the chiller 44 and returned to a cooling tower 41 where heat energy in the cooling water is allowed to dissipate. As the cooling water 21 dissipates heat, the cooling water is collected in a sump 42.

The electrodes 22, 24 are submerged in and directly contact the cooling water 21 in the sump 42. The cooling water 21 exits the sump 42 by gravity through a discharge outlet 46 and flows back to the chiller 44. The electrodes 22,24 are positioned on opposite sides of the outlet 46 so that the cooling water stream 21 passes between the electrodes as it exits the sump 42. The electrodes 22, 24 may be formed of any appropriate material. Preferably, the electrodes 22, 24 are formed of graphite or other non-metal material and are insulated from the bottom of the sump 42.

Figure 3:
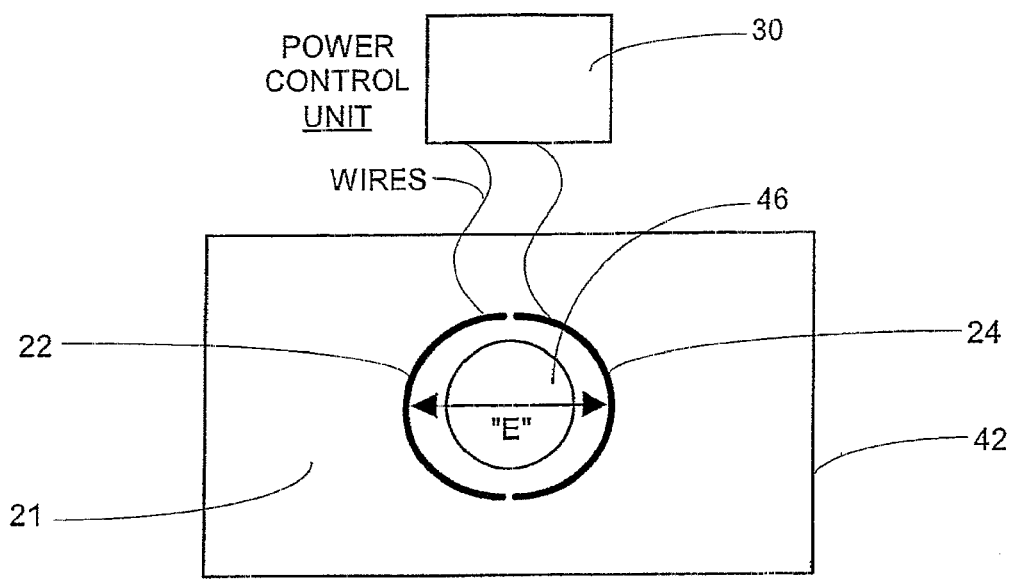
FIG. 3 is a schematic top plan view of the water treatment apparatus used in the water coolant system of FIG. 2.
Figure 4:
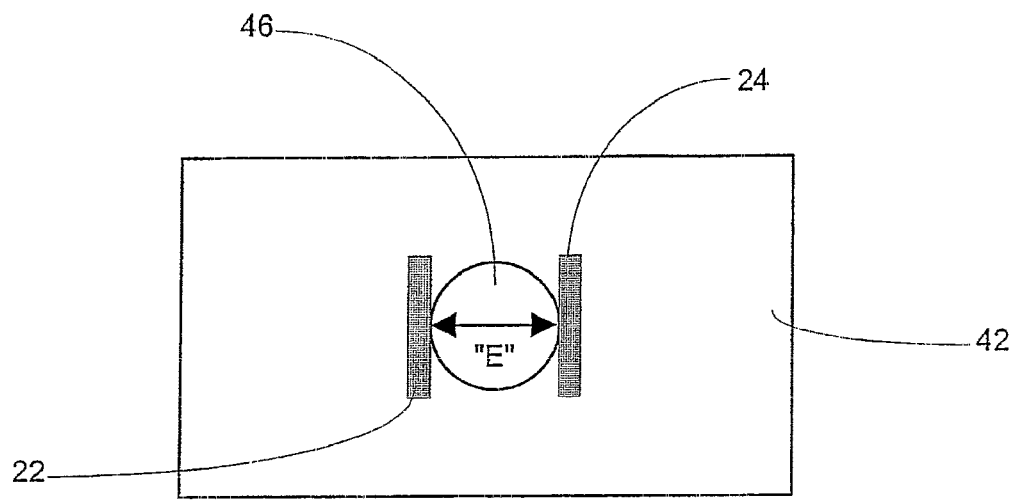
FIG. 4 is a schematic top plan view of a first alternate embodiment of a water treatment apparatus in accordance with the present invention.
Figure 5:
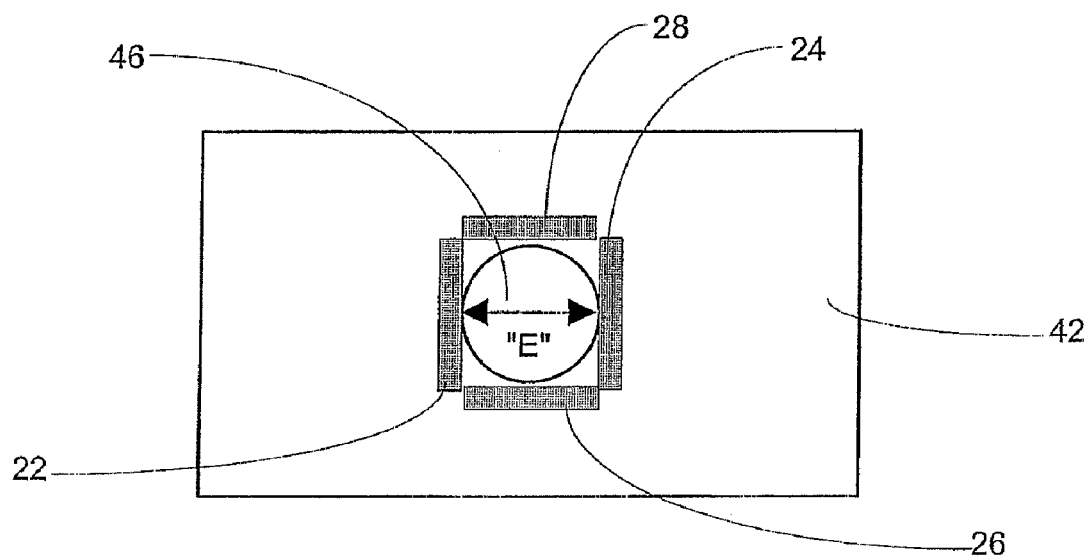
FIG. 5 is a schematic top plan view of a second alternate embodiment of a water treatment apparatus in accordance with the present invention.

Referring to FIG. 3, the electrodes 22, 24 are each shown as having a generally arcuate or semi-circular cross section. The electrodes 22, 24 are positioned symmetrically about the outlet 46. The shape of the electrodes 22, 24 may be configured in a number of ways to apply an electric field across the cooling water as it is discharged from the sump 42. As shown in FIG. 4, the electrodes 22, 24 have a planar shape. One or more pairs of planar electrodes may be used to direct an electric field across the coolant stream. In FIG. 4, one pair of opposing electrodes 22, 24 is disposed adjacent to the sump outlet 46. In FIG. 5, two pairs of electrodes 22, 28 and 24, 26 are disposed adjacent to the sump outlet 46. Regardless of the number and arrangement of electrodes used, the electrodes are preferably fixed in a stable position in the sump 42. The electrodes may be stabilized by suspension rods, brackets or other suitable supports.

Referring again to FIG. 2, the electrodes 22, 24 are connected to power source 30. The power source 30 is operable to apply a voltage difference across the electrodes 22, 24 to form an electric field across the cooling water stream as it exits the sump 42. The voltage is applied as an alternating wave and may be generated from an AC power source.

The voltage may have one of a variety of wave patterns, such as a square wave, trapezoidal wave, or sinusoidal wave. The polarity of the electrodes 22, 24 is reversed at a controlled frequency to induce an electric field in the coolant. Preferably, the polarity of the electrodes 22, 24 is reversed at a frequency between 500 Hz and 100,000 Hz. For example, a frequency greater than 1,000 Hz may be used for a 12V signal and an output current of between 5-10 amperes.

A major benefit of the present invention is that it provides a higher electric field intensity in the coolant than other PWT methods. Since the electrodes are placed in the liquid stream rather than on the exterior of a pipe or tank, there is virtually no restriction on the frequency or current that can be used. In addition, there is no restriction on pipe diameter. A field strength of 1 V/cm may be produced in a 6-inch diameter fluid conduit, which is 200 times greater than the field strength associated with the solenoid-coil system. Since the electric field is not subject to self-induction, the frequency can be increased to 100,000 Hz or higher. Field strength may be increased up to 10 V/cm if desired. Moreover, the applied electric potential is safe to use because it can be as low as 12 V.

Figure 6:
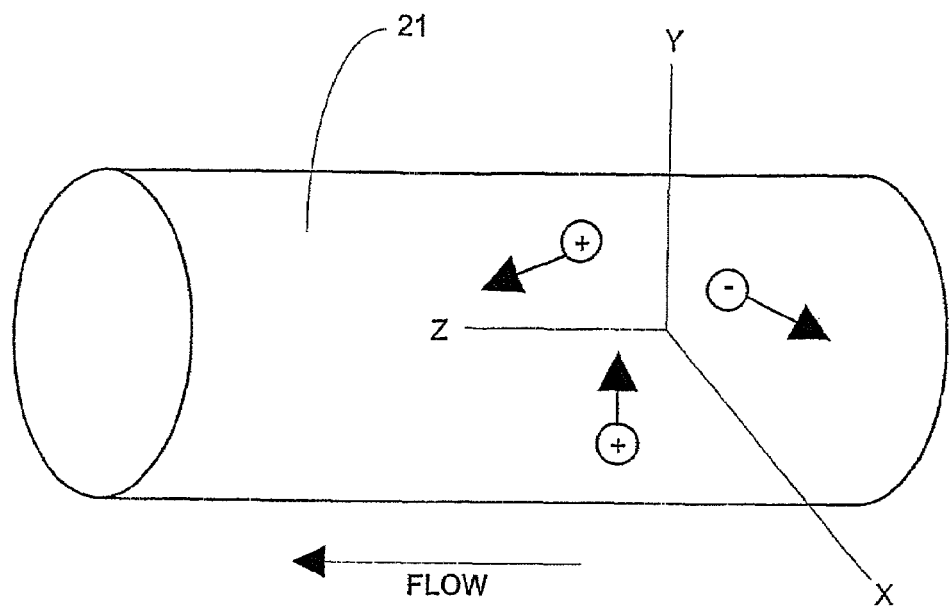
FIG. 6 is a schematic diagram illustrating the mobility of mineral ions in a coolant stream in the absence of an electric field.
Figure 7:
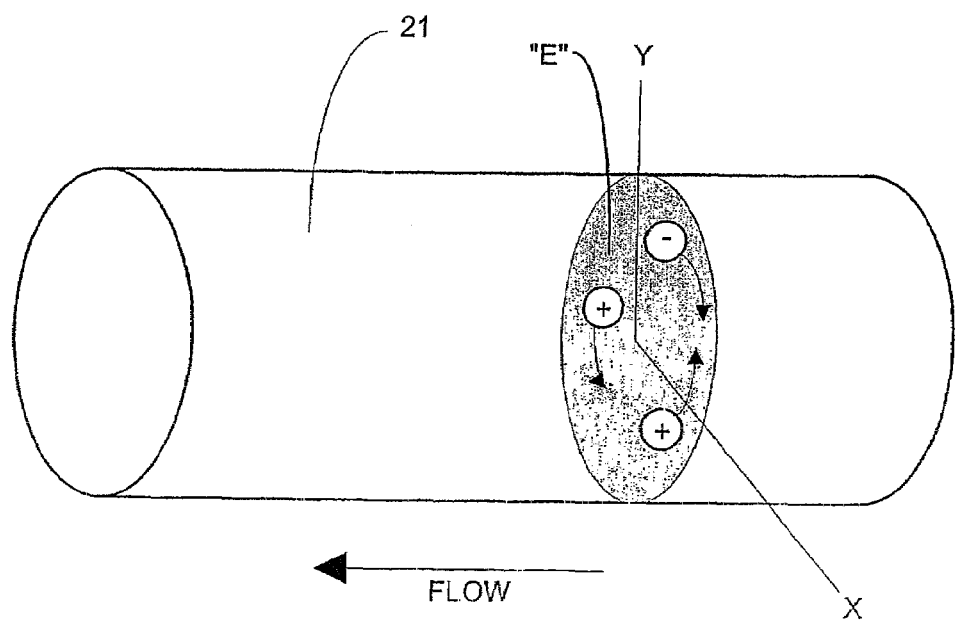
FIG. 7 is a schematic diagram illustrating the mobility of mineral ions in a coolant stream in the presence of an electric field applied in accordance with the present invention.

Referring now to FIGS. 6 and 7, the effect of the electric field on mineral ions in the cooling water 21 will be described in more detail. In the absence of an electric field, mineral ions in the cooling water stream have freedom of motion in a three-dimensional space. FIG. 6 illustrates the three-dimensional motion of mineral ions in a fluid conduit in the absence of an electric field. Positive and negative ions are free to move radially with respect to the conduit, i.e. in a two dimensional plane represented by the X and Y axes in FIG. 6. The ions are also free to move axially with respect to the conduit, i.e. in the direction of the Z axis in FIG. 6. With this freedom of motion, and the small size of the dissolved ions, the statistical probability of collision between ions and bulk precipitation of minerals is relatively small.

Now referring to FIG. 7, the motion of mineral ions in the cooling water 21 is illustrated in the presence of an electric field directed orthogonally to the flow direction. When the electric field E is applied to the cooling water stream 21, ions in the cooling water are subject to the electromotive forces induced by the electric field. The orthogonal forces limit movement of the ions to a two dimensional plane relative to the stream, as shown by the shaded cross-sectional area in FIG. 7. The electric field moves positively charged ions in one direction and negatively charged ions in the opposite direction, so that positive and negative ions are driven toward one another. Since the electric field limits movement of the ions to a single plane, the electric field increases the statistical probability of collision between ions and bulk precipitation of minerals. As a result, the electric field promotes the collision of ions, such as $Ca^{++}$ and $HCO_3^-$, thereby causing the ions to combine and form mineral or seed particles through bulk precipitation. As discussed earlier, bulk precipitation decreases the concentration of free ions in the cooling water that enter the heat exchanger 44, thereby reducing the potential for scaling on the heat transfer surface. The seed particles that enter the heat exchanger attract mineral ions as the dissolved mineral ions come out of solution, further reducing the potential for scaling in the heat exchanger.

Referring now to FIGS. 2 and 7, the operation of the cooling water system 40 will now be described. Cooling water 21 is collected in the sump 42 and exits the sump through the outlet 46. Electric power is supplied to the electrodes 22, 24 from the power source 30 and creates a voltage difference across the electrodes. The polarity of the electrodes are alternated to form an oscillating electric field through the cooling water stream 21. As the cooling water stream 21 passes through the electric field, mineral ions are taken out of solution and form seed particles through bulk precipitation, as described earlier. The seed particles are suspended in the cooling water stream 21 as it exits the sump 46 and travels to the chiller 44. The cooling water stream 21 may be conveyed to the chiller 44 via a pump 48, as shown in FIG. 2.

Cooling water enters the condenser side of the chiller 44 and contacts the refrigerant condenser tubes. As the cooling water 21 contacts the hot condenser tubes, it absorbs heat, and the temperature of the cooling water rises, causing mineral ions to come out of solution. The seed particles formed from bulk precipitation attract the ions and progressively grow into larger particles. The heated cooling water stream 21 and mineral particles are discharged from the chiller 44 and conveyed to the cooling tower 41 where the heat energy is dissipated. The mineral particles in the cooling water 21 gradually settle to the bottom of the sump 42 and form soft sludge. Periodically, the sludge is removed from the bottom of the sump through a drain 43 or other suitable clean out method.

In some instances, mineral particles may settle in other areas of the cooling system 40, including the heat transfer surfaces in the chiller 44. Since the settled mineral particles form a soft sludge, the sludge is easily removed by shear forces created by passing cooling water.

Thus far, the electrodes 22, 24 have been shown and described at the base of the sump. It should be understood, however, that electrodes may be installed at any point in the coolant loop to apply an electric field across the cooling water stream. For example, the electrodes 22, 24 may be provided inside the coolant pipe upstream in relation to the heat exchanger 44. In addition, electrodes may be placed at multiple locations within the coolant loop.

Figure 8:
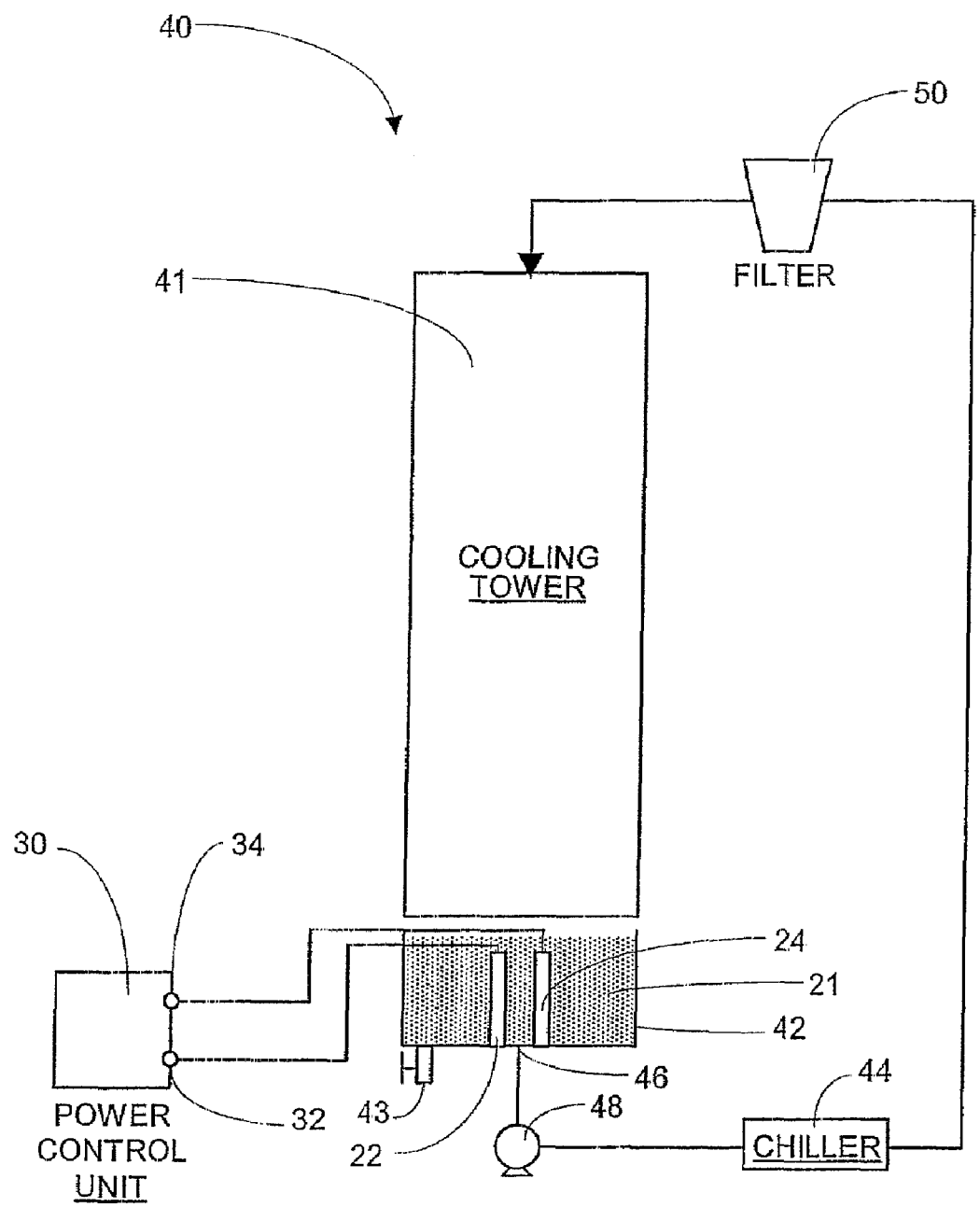
FIG. 8 is a schematic diagram of a second embodiment of a water coolant system according to the present invention which includes an in-line filter.

Mineral particles formed by bulk precipitation may be removed by settling the particles in the sump, as described earlier. Alternatively, the mineral particles may be removed from the coolant stream by a filter installed in the coolant system 40. Referring now to FIG. 8, a filter 50 is shown installed in the coolant return line between the chiller 44 and the cooling tower 41. As mineral particles attach to mineral ions that come out of solution, the particles can reach sizes on the order of 5-10 μm. The specific gravity of these particles can be three times heavier than water. As a result, the particles can be removed easily using any appropriate filter, such as a mechanical filter or sand filter. Preferably, the particles are filtered by a cyclone filter, which is not prone to clogging or plugging by $CaCO_3$ and other mineral deposits that accumulate in the filter.

Figure 9:
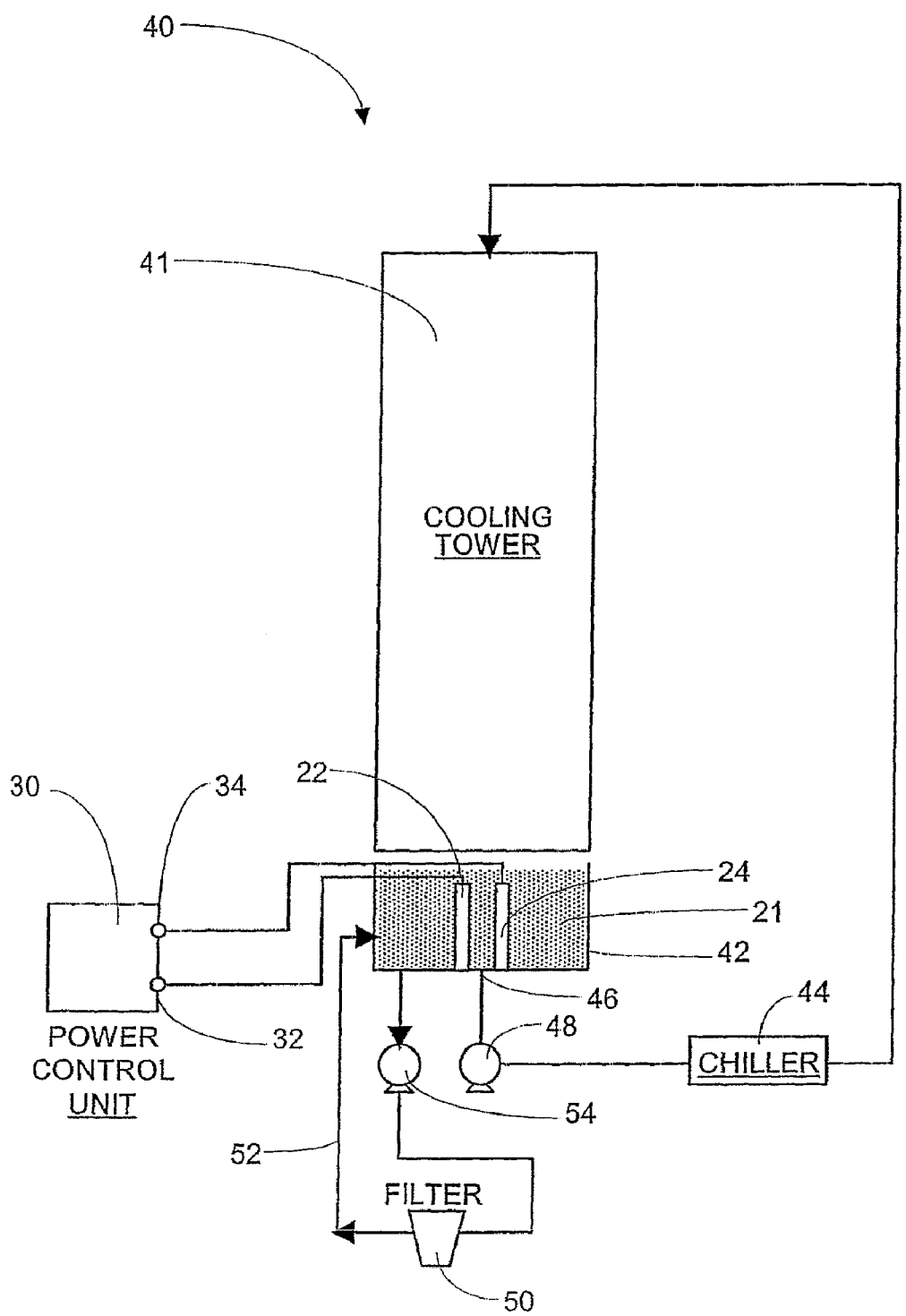
FIG. 9 is a schematic diagram of a third embodiment of a water coolant system according to the present invention which includes a side-stream filter.

Alternatively, the filter 50 is installed in a side-stream loop 52 extending from the cooling tower 41, as shown in FIG. 9. A side-stream loop may be desired, for example, where larger pipe diameters (greater than four inches) are used in the main coolant loop. A filtration pump 54 is installed in the side-stream loop 52 to draw cooling water and sludge from the sump 42 of the cooling tower 41. The pump discharges the water and sludge through the filter 50 to remove mineral particles from the water. The filtered water is returned to the sump 42, where it is reused in the cooling system 40.

It may be desirable to use the foregoing treatment method and apparatus with other treatment options to improve the quality of the cooling water and reduce harmful deposits on heat transfer equipment. For example, the present invention may include the addition of a polymer solution to the cooling water. Long chain water-soluble compounds, such as polyethylene oxide (PEO) or polyacrylamide (PAM), may be added to cooling water with a high hardness, i.e. a high mineral content. These compounds help bridge calcium ions together in hard water. By bridging calcium ions, the availability of calcium ions in solution is reduced, decreasing the potential for scaling at heat transfer surfaces.

Thus far, the present invention has been described as it is used to reduce the occurrence of scaling in a cooling water system. The application of an electric field can also be used to prevent growth of bacteria, algae and other microorganisms present in a coolant stream. Uncontrolled growth of microorganisms, called biofouling, can degrade the performance of heat transfer equipment and potentially damage the equipment. Biofouling is effectively eliminated by applying an electric field to the cooling water stream at a current and frequency adequate to kill the microorganisms. In many cases, this is the same operating current and frequency used to promote bulk precipitation of minerals, as described above. Microorganisms may also be destroyed by the action of submicron mineral particles, which are toxic to certain microorganisms. Electrodes may be placed at the sump outlet 46, and/or at locations where microorganism growth is most likely to occur. Destroyed biological material can be removed from the cooling water using the same techniques for removing mineral particles.

Figure 10:
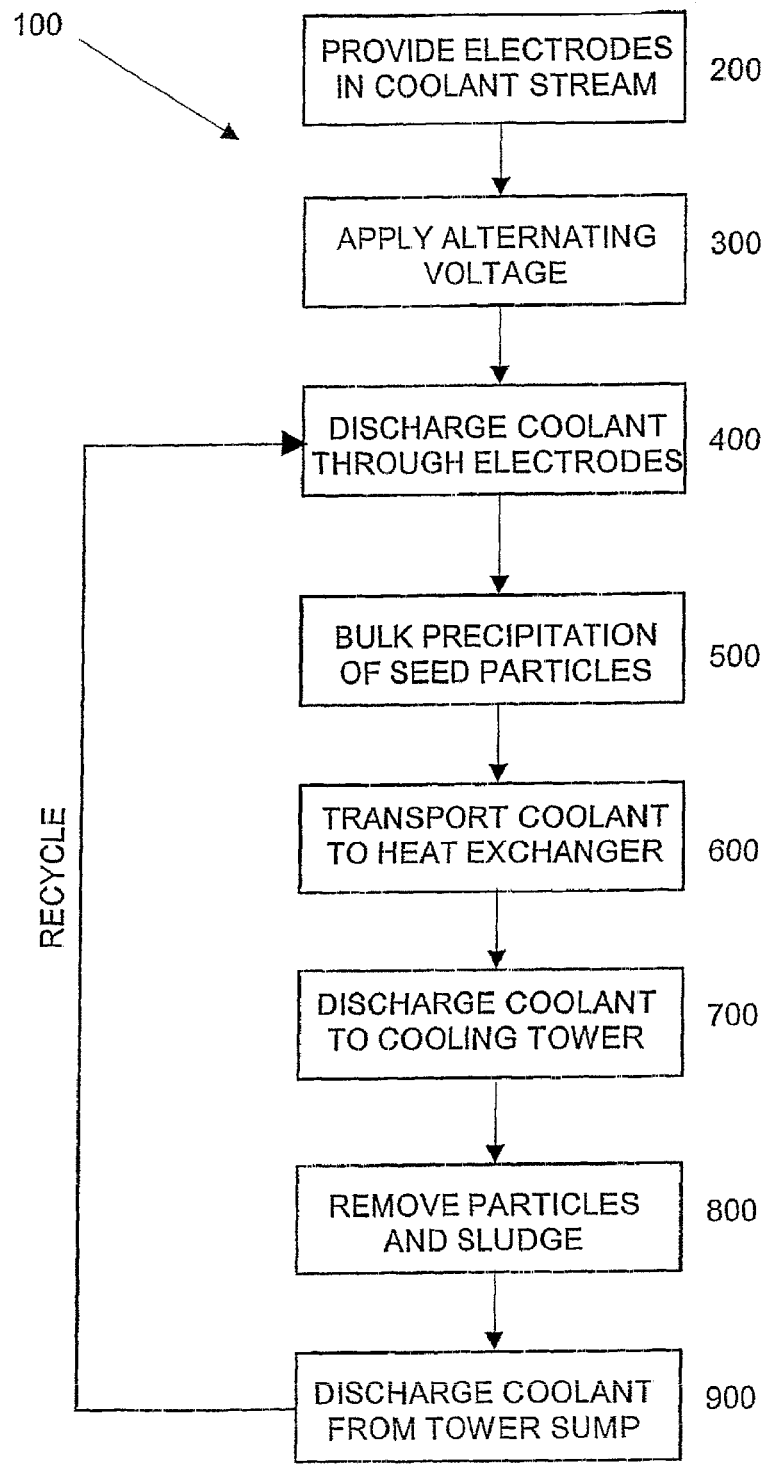
FIG. 10 is a flow diagram showing the steps of a method of treating coolant water in accordance with the present invention.

Referring now to FIG. 10, a block flow diagram illustrates the preferred method for using a PWT system in a cooling water system. It will be understood that the diagram represents just one possible PWT method. The order in which the steps appear is not intended to represent the only possible sequence of steps, and other steps may be added or omitted without deviating from the scope of the method according to the invention.

In step 200 of the preferred method, electrodes are provided in the cooling water. In step 300, an alternating voltage is applied across the electrodes to produce an electric field in the water between them. The polarity of the voltage is varied at a high frequency to produce an oscillating electrical field. In step 400, the cooling water stream is conveyed through the electrodes. As the cooling water passes between the electrodes, the oscillating electrical field stimulates the collision of dissolved ions in the cooling water.

In step 500 of the preferred method, the electrical field frequency is controlled to promote bulk precipitation of mineral ions out of solution. Efficiency of bulk precipitation increases as frequency is increased. The ions are precipitated into seed particles that are suspended in the cooling water and carried through the system by the cooling water stream. In step 600, the cooling water and seed particles are conveyed to a heat exchanger, such as a chiller unit. The cooling water passes through the condenser tubes of the chiller where the cooling water absorbs heat from the condenser tubes. As the cooling water increases in temperature, dissolved mineral ions come out solution and bind with the seed particles through intermolecular attraction.

In step 700 of the preferred method, the heated coolant is discharged from the chiller unit and conveyed to a cooling tower. Heat energy in the cooling water is dissipated in the cooling tower. As the cooling water dissipates heat, larger mineral particles settle to the bottom of the sump in the cooling tower and form a soft sludge. In step 800, the mineral particles and sludge are removed from the cooling water. Sludge may be removed through a drain or clean-out port at the bottom of the sump. Alternatively, or in addition, cooling water may be pumped through a side-stream filter line to remove mineral particles from the cooling water, as described earlier. Filtered cooling water is returned to the sump. In step 900, cooling water is discharged from the sump. The cooling water is recirculated through the system, and steps 400-900 are repeated.

The terms and expressions which have been employed are used as terms of description and not of limitation. There is no intention in the use of such terms and expressions of excluding any equivalents of the features shown and described or portions thereof. It is recognized, therefore, that various modifications are possible within the scope and spirit of the invention. Accordingly, the invention incorporates variations that fall within the scope of the following claims.

I claim:

1. A method for treating a stream of liquid, comprising the steps of:
   A. placing a first electrode and a second electrode in direct contact with a liquid stream such that the liquid stream flows between the first and second electrodes; and
   B. applying an alternating voltage having a frequency of at least 3,000 Hz between the first and second electrodes to generate an oscillating electrical field across the liquid stream, to promote bulk precipitation of ions and reduce fouling of a heat transfer surface in contact with said liquid.

2. The method of claim 1, wherein the step of applying the alternating voltage between the electrodes comprises applying a voltage having a pre-selected wave form across the electrodes.

3. The method of claim 2, wherein the pre-selected wave form is selected from the group consisting of a square wave, a trapezoidal wave, and a sinusoidal wave.

4. The method of claim 2, further comprising the step of passing the liquid stream through a filter after mineral particles are precipitated to remove the mineral particles from the liquid.

5. The method of claim 4, wherein the filter comprises a cyclone filter.

6. The method of claim 1, wherein the step of applying an alternating voltage between the electrodes comprises generating an electrical field having a magnitude and a frequency sufficient to destroy at least one of bacteria, algae and microorganisms.

7. The method of claim 1, wherein the step of applying an alternating voltage between the first and second electrodes comprises forming an electrical field in the liquid stream with a field strength of at least 1 V/cm.

8. The method of claim 7, wherein the step of applying an alternating voltage between the first and second electrodes comprises forming an electrical field in the liquid stream with a field strength of 1 V/cm to 10 V/cm.

9. The method of claim 1, wherein said frequency is at least 100,000 Hz.

10. The method of claim 1, further comprising the step of increasing the temperature of the liquid stream to induce additional precipitation of mineral particles from said solution.

11. The method of claim 10, further comprising the step of cooling said liquid stream subsequent to the step of increasing the temperature of said liquid stream to cause mineral particles to settle.

12. The method of claim 1, further comprising the step of directing the flow of mineral ions to promote precipitation of mineral particles.

13. The method of claim 12, further comprising the step of transporting precipitated mineral particles through the liquid to promote further precipitation of mineral particles.

14. The method of claim 1, wherein the step of providing the first and second electrodes in direct contact with the liquid stream comprises the step of mounting the first and second electrodes to an interior wall of a conduit carrying said liquid stream.

15. The method of claim 1, wherein the step of providing the first and second electrodes in direct contact with the liquid stream comprises the step of mounting the electrodes to a discharge outlet of a container holding the liquid stream.

16. The method of claim 1, wherein the step of applying an alternating voltage comprises the step of controlling the frequency of the voltage to stimulate formation of $CaCO_3$ and $MgCO_3$ crystals.

17. The method of claim 1, further comprising the step of adding a chemical additive to the liquid for promoting the precipitation of minerals from the liquid.

18. A method of reducing scale formation on the interior of a heat exchanger in a closed loop system containing a stream of cooling water, said method comprising the steps of:

A. providing a first and a second electrode in a closed loop cooling water system upstream from a heat exchanger such that the cooling water is in direct contact with and flows between the first and second electrodes;

B. applying an alternating voltage having a frequency of at least 3,000 Hz between the first and second electrodes to generate an electrical field across the cooling water stream to promote bulk precipitation of ions and reduce fouling of a heat transfer surface in contact with said liquid;

C. transporting the cooling water stream into the heat exchanger to precipitate additional mineral ions from solution upon heating of the cooling water stream in the heat exchanger;

D. removing precipitated mineral crystals from the cooling water stream, to reduce said scale formation; and E. recycling the cooling water stream back through the first and second electrodes.

19. The method of claim 18, wherein the step of applying an alternating voltage between the electrodes comprises forming a voltage wave operable to stimulate collision of mineral ions in solution in the cooling water and precipitate crystals from said cooling water.

20. The method of claim 19, further comprising the step of passing the cooling water through a filter after the mineral crystals are formed to remove the mineral crystals from the cooling water.

21. The method of claim 20, wherein the filter comprises a cyclone filter.

22. The method of claim 18, wherein the step of applying an alternating voltage between the electrodes comprises generating an electrical field having a magnitude and a frequency sufficient to destroy at least one of bacteria, algae and microorganisms.

23. The method of claim 18, wherein the step of applying an alternating voltage between the first and second electrodes comprises forming an electrical field in the liquid stream with a field strength of at least 1 V/cm.

24. The method of claim 23, wherein the step of applying an alternating voltage between the first and second electrodes comprises forming an electrical field in the liquid stream with a field strength of 1 V/cm to 10 V/cm.

25. The method of claim 18, wherein said frequency is at least 100,000 Hz.

26. The method of claim 18, further comprising the step of cooling the heated cooling water stream to cause precipitated mineral crystals to settle out of said cooling water stream.

* * * * *